(12) United States Patent
Park

(10) Patent No.: US 8,736,109 B2
(45) Date of Patent: May 27, 2014

(54) POWERING A DATA CENTER USING MULTIPLE CONNECTIONS FROM A UTILITY GRID

(75) Inventor: Seung Hoon Park, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 861 days.

(21) Appl. No.: 12/948,628

(22) Filed: Nov. 17, 2010

(65) Prior Publication Data

US 2012/0119585 A1 May 17, 2012

(51) Int. Cl.
*H02J 9/00* (2006.01)
*H02J 3/00* (2006.01)

(52) U.S. Cl.
USPC .............................................. 307/64; 307/80

(58) Field of Classification Search
USPC ........................................................ 307/80, 64
See application file for complete search history.

(56) References Cited

U.S. PATENT DOCUMENTS

| | | | |
|---|---|---|---|
| 2009/0248854 A1* | 10/2009 | Conway | 709/224 |
| 2011/0316337 A1* | 12/2011 | Pelio et al. | 307/24 |
| 2012/0109705 A1* | 5/2012 | Belady et al. | 705/7.22 |

* cited by examiner

*Primary Examiner* — Rexford Barnie
*Assistant Examiner* — Dru Parries
(74) *Attorney, Agent, or Firm* — Fenwick & West LLP

(57) ABSTRACT

A data center is electrically coupled to a power grid at two separate access points, which may be located within geographic proximity to each other. Each access point is located between two power generation systems. The access points have one or more power generation systems located between them, allowing the data center to be coupled to three or more power generation systems simultaneously and have access to power in the event of multiple power generation system failure. The data center may comprise two separate data center power inputs, which may each be connected to a separate power grid access point. The power grid may provide a high voltage level to the data center, and the data center may comprise transformers which step the voltage down to a lower voltage level. The data center may comprise one such transformer coupled to each of the two data center power inputs. The outputs of such transformers may be coupled together.

10 Claims, 2 Drawing Sheets

POWERING A DATA CENTER USING MULTIPLE CONNECTIONS FROM A UTILITY GRID

BACKGROUND

This invention relates generally to providing electrical power for data centers, and in particular to providing data centers with consistent access to power without requiring the use of generators.

Data centers are a staple of modern computer communication strategy and theory. With the advent of the Internet, which allows high-bandwidth communication between remote locations, the data center has become a cost-effective and resource-efficient method of operating and managing large-scale networks. Data centers typically contain telecommunication and networking equipment, such as routers and switches, able to accommodate the communication requirements of the supported network. In addition, data centers often contain banks of computer servers, which provide both processing and data storage functionality. Data center components are typically collocated; this geographic uniformity results in the consideration of the data center and the data center components as a single entity.

Given the centralized nature of data centers, it is often important to maximize the availability of data center functionality to network users (often 99% of the time or greater). Data center down time (i.e., when the data center functionality is not available) frustrates network users and often results in lost income to the network operator. A primary cause of data center down time is a lack of power availability to the data center. One solution to avoid losing power is to couple back-up power generators to the data center, which provides power in the event that the primary power source becomes unavailable. However, generators are both expensive and highly carbon-emitting. For massive data centers, the number of generators required can be large, resulting in very high expenses and emissions. Accordingly, a solution to provide energy to data centers that is both inexpensive to implement and environmentally-friendly that can simultaneously guarantee high power availability is needed.

SUMMARY

To address the needs of reliable power access for data centers, embodiments of the invention provide power to a data center by connecting the data center to a power grid at two separate access points. The data center is coupled to a first power grid access point located between two power generation systems and a second power grid access point located between two power generation systems, with at least one power generation system located between the two access points. In this way, if one location on the grid fails so that the connection between the grid and one of the access points to the data center is lost, the data center can obtain power from the other access point. This redundancy obviates the need for a generator at the data center to provide backup power in the event of grid failure.

In various embodiments, one or multiple power generation systems may be located between the access points, and each power grid access point may be coupled to separate data center power inputs. The access points may be located within close geographic proximity of each other. The power grid may provide high voltage to each data center power input, and the data center may use transformers to produce a lower voltage. In one embodiment, the lower voltage outputs of the transformers for each data center power input are connected.

Figure 1:
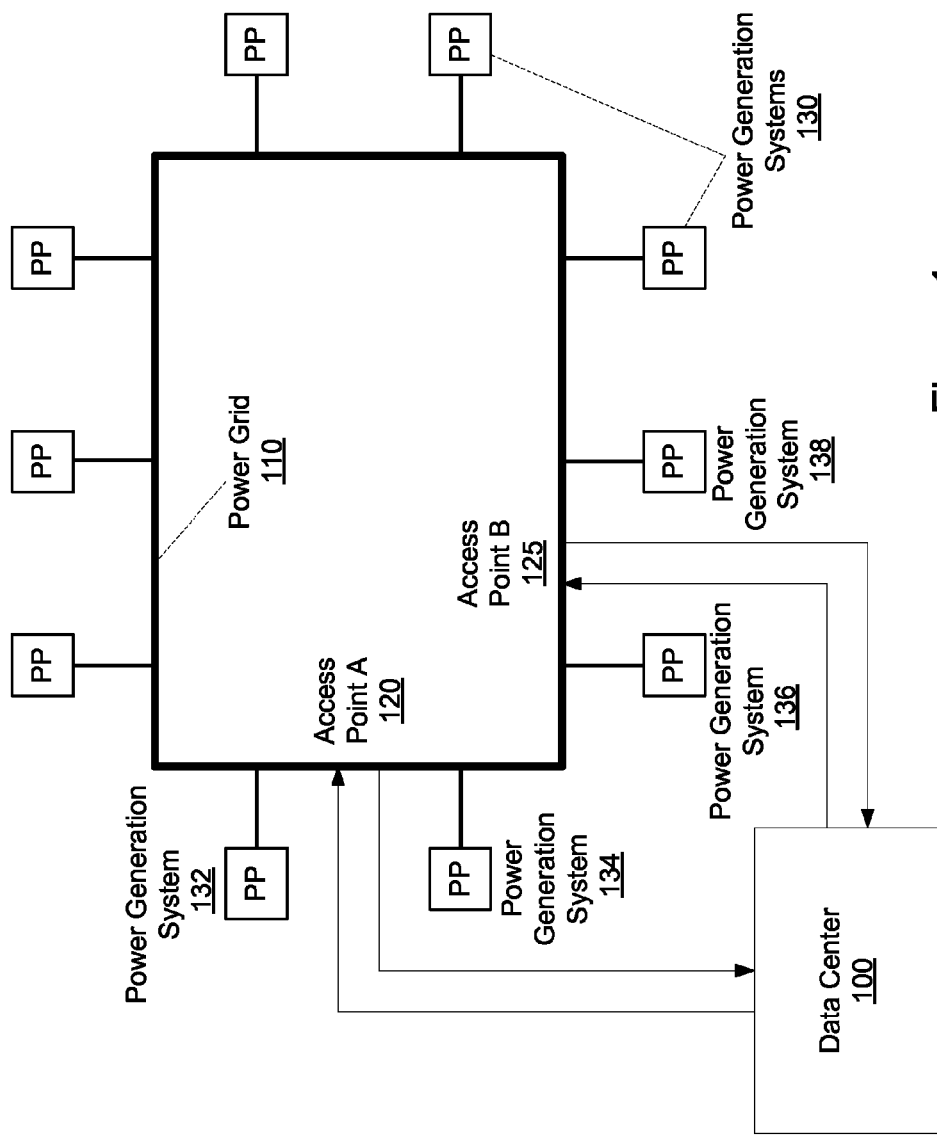
FIG. 1 is a block diagram of a system for providing power to a data center from a grid, in accordance with one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Power grids are used to manage and regulate the distribution of power to communities, cities and countries. Power grids generally comprise one or more power generation systems, coupled together with a power-transferring capable conduit, such as power lines. Power generation systems are typically power plants, such as fuel-based power plants (e.g. nuclear, natural gas, coal and oil), geothermal power plants, renewable energy power plants (such as biomass fuel, solar, solar thermal, and wind), hydroelectric plants, and any other large-scale power producing and supplying entity. Power conduits such as power lines may be above ground or underground, and may range in purpose from long-distance power transfer to local power distribution. When an uninterrupted power conduit exists between two entities in the power grid, the entities are said to be "connected." When two entities are connected, it is possible for power to be transferred between them. When two entities are not connected, no power transfer is possible. When power is drawn from the power grid, it is said to be drawn from an access point. An access point is simply a location within the power grid where power can be transferred from the grid to a non-power grid entity (a "power user").

Power grids may take a variety of forms. For instance, a power grid may be a closed loop, with power generation systems distributed throughout the loop. Alternatively, a power grid may be built around the location of the power generation systems, the location of population centers, or any other suitable criteria necessary to construct a power grid that can transfer power from power generation systems to power users. Power grids may comprise multiple different types of power generation systems, and may supply power to multiple different types of power users. When power is unavailable to power users on all or part of the power grid, the power grid is said to be "down" or experiencing "downtime." Power downtime may be caused by a variety of factors, including overconsumption of available power by power users, the failure or unavailability of a power generation system, a failure or breach in power conduit within the power grid, or any other cause that results in a power user being unable to draw power from the power grid.

When a power generation system fails or becomes unavailable, the power generation system does not supply power to the power grid. In such instances, other power generation systems on the power grid may continue to supply power to the power grid to the extent they are able, and power users may continue to draw power from these other power generation systems so long as the power users are connected these other power generation system through the grid. In some instances, there may be a bottleneck in the grid such that if a particular power generation system or particular power conduit fails, an affected portion of the grid is no longer connected to the remainder of the grid. In these instances, the presence of operational power generation systems elsewhere in the grid is immaterial, as power users in the affected portion of the grid are not connected to the operational power generation systems in the remainder of the grid and thus are unable to draw power from the operational power generation systems.

FIG. 1 is a diagram of the system for providing power to a data center, in accordance with one embodiment of the invention. The system comprises a data center 100, a power grid 110, a first power grid access point (access point A) 120, a second power grid access point (access point B) 125, and multiple power generation systems 130. The shape of the power grid 110, the location of access point A 120 and access point B 125, and the number and location of power generation systems 130 may vary according to the embodiment of the invention and are not limited to the configuration of FIG. 1. Accordingly, the description of the claimed invention is limited to the configuration of FIG. 1 for illustrative purposes only, and does not reduce the scope of the claimed invention in regards to other configurations or embodiments in any way.

Data center 100 draws power from the power grid 110 from access point A 120 and access point B 125. In one embodiment of the claimed invention, there are two or more power generation systems 130 between access point A 120 and access point B 125. Generally, as the geographic distance between an access point and the data center 100 increases, the efficiency of power transfer decreases (and accordingly, the amount of power lost in transmission increases). Thus, in one embodiment, access point A 120 and access point B 125 may be located within close geographic proximity of each other. In one embodiment, there is only one power generation system 130 between access point A 120 and access point B 125. By having one or more power generation systems 130 between access point A 120 and access point B 125, the data center 100 will continue to continue to be connected to a power generation system 130 in the event of a power generation system 130 or power grid 110 failure or downtime. Data center 100 will no longer be connected to a power generation system 130 in the event that either the power generation system 130 fails or the power grid 110 between the access point and the power generation system 130 is breached or fails.

In the embodiment of FIG. 1, the data center 100 is connected through access point A 120 to power generation system 132 and power generation system 134. Similarly, the data center 100 is connected through access point B 125 to power generation system 136 and power generation system 138. Thus, the only circumstance that would result in a power supply not being available to data center 100 would be if either the power generation system 130 failed or the power grid 110 between a power generation system 130 and an access point failed for each of power generation system 132, 134, 136 and 138 simultaneously. For example, if power generation systems 132, 134 and 136 simultaneously went down, but power generation system 138 remained operational and the power grid between access point B 125 and power generation system 138 did not fail, then the data center 100 would be connected to the operational power generation system 138, and would continue to be able to draw power, thus maintaining the availability of data center functionality. In an alternative embodiment, power generation systems 134 and 136 comprise the same power generation system 130, thus reducing the number of power generation systems 130 immediately connected to data center 100 to three. The probabilities of three or more power generation systems 130 failing simultaneously is sufficiently low that data center 100 backup generators are not needed in order to maximize the availability of data center functionality.

Figure 2:
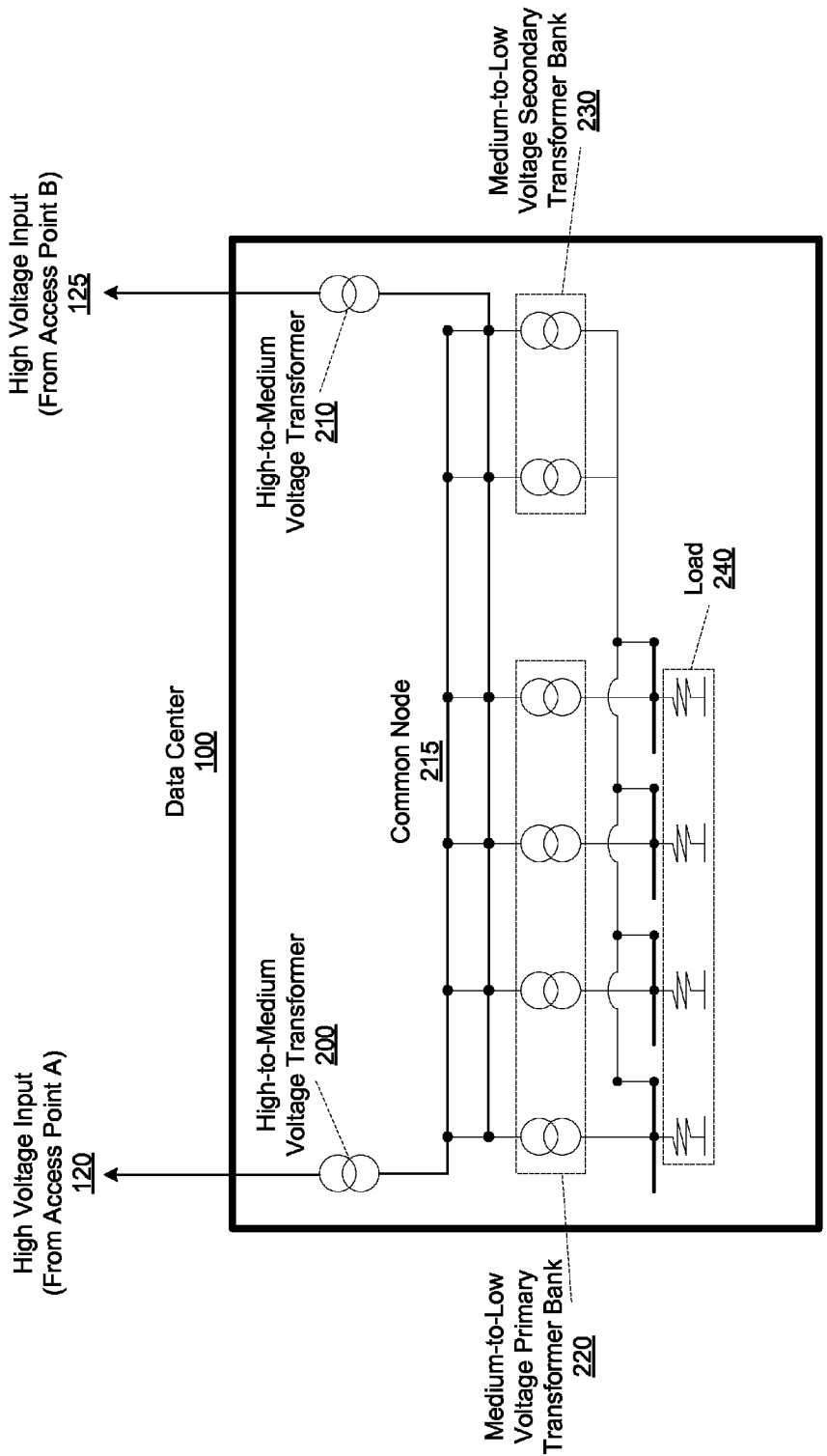
FIG. 2 is a circuit diagram of electronics in the data center for receiving power from the grid, in accordance with an embodiment of the invention.

FIG. 2 is a diagram of one embodiment of data center electronics which may be used in conjunction with the claimed invention. Data center 100 is supplied with high voltage at data center power inputs coupled to access point A 120 and access point B 125. In one embodiment, high voltage comprises approximately 400 kV or greater. High voltage from access point A 120 is coupled to transformer 200 and high voltage from access point B 125 is coupled to transformer 210, both of which step the high voltage down to a medium voltage level. In one embodiment, medium voltage comprises approximately 12 kV. In the embodiment of FIG. 2, the outputs of transformers 200 and 210 are coupled together to form a common node 215. In the embodiment of FIG. 2, common node 215 is coupled to transformer banks 220 and 230. Transformer bank 220 comprises a primary transformer bank, and transformer bank 230 comprises a secondary transformer bank. In one embodiment, these transformer banks step the medium voltage down to a low voltage. In one embodiment, low voltage comprises approximately 400V-480V. The voltages discussed with respect to FIG. 2 are merely exemplary; other voltage levels and ranges may be used and are in no way excluded from inclusion in alternative embodiments of the invention.

The outputs of primary transformer bank 220 are coupled to load 240. In one embodiment, this load comprises severs or any other data center components. In one embodiment, the outputs of individual transformers in primary transformer bank 220 are coupled to separate loads 240 comprising different components and/or entities. The outputs of secondary transformer bank 230 are also coupled to load 240. In one embodiment, secondary transformer bank 230 is only operational in the event of a failure of one or more transformers in primary transformer bank 220. In an alternative embodiment, secondary transformer bank 230 provides additional power to load 240 in the event that one or more transformers in primary transformer bank 220 is unable to supply a required amount of power to load 240. The number and type of transformers in transformer banks 220 and 230 may vary and are not limited to the embodiment of FIG. 2. In one embodiment, data center 100 may have multiple primary transformer banks 220 and multiple secondary transformer banks 230; in one embodiment, data center 100 does not have a secondary transformer bank 230.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
electrically coupling a first input of a first transformer of a data center to a first access point of a power grid, the first transformer configured to output via a first output a lower voltage than a voltage provided by the power grid, wherein the power grid comprises an interconnected network of power generation systems, and wherein the first power grid access point is located between two power generation systems; and electrically coupling a second input of a second transformer of the data center to a second access point of a power grid, the second input not coupled to the first input, the second transformer configured to output via a second output coupled to the first output a lower voltage than the voltage provided by the power grid, wherein the second power grid access point is located between two power generation systems;

wherein at least one power generation system is located between the first power grid access point and the second power grid access point.

2. The method of claim 1, wherein the locations of the first and second access point on the power grid are selected to minimize power transmission losses.

3. The method of claim 1, wherein one or more of the power generation systems comprise hydroelectric power plants.

4. The method of claim 1, wherein the data center receives power exclusively from the power grid.

5. A method comprising:
electrically coupling a first input of a first transformer of a data center to a first access point of a power grid, the first transformer configured to output via a first output a lower voltage than a voltage provided by the power grid, wherein the power grid comprises an interconnected network of power generation systems, and wherein the first power grid access point is located between a first and a second power generation system; and electrically coupling a second input of a second transformer of the data center to a second access point of a power grid, the second input not coupled to the first input, the second transformer configured to output via a second output coupled to the first output a lower voltage than the voltage provided by the power grid, wherein the second power grid access point is located between the second and a third power generation system.

6. The method of claim 5, wherein the locations of the first and second access point on the power grid are selected to minimize power transmission losses.

7. A system comprising:
a power grid comprising a plurality of power generation systems coupled to a transmission line;
a data center comprising a first transformer and a second transformer, the first transformer comprising a first input and a first output, the second transformer comprising a second input not coupled to first input and a second output coupled to the first output, the first transformer and the second transformer each configured to output a lower voltage than a voltage provided by the grid;
a transmission line electrically coupling the first input to the power grid at a first access point thereon, the first access point located between two power generation systems; and
a transmission line electrically coupling the second input to the power grid at a second access point thereon, the second access point located between two power generation systems, wherein at least one power generation system is coupled to the power grid between the first and second access points.

8. The system of claim 7, wherein the locations of the first and second access point on the power grid are selected to minimize power transmission losses.

9. The system of claim 7, wherein one or more of the power generation systems comprise hydroelectric power plants.

10. The system of claim 7, wherein the data center receives power exclusively from the power grid.

* * * * *